Figure 1:
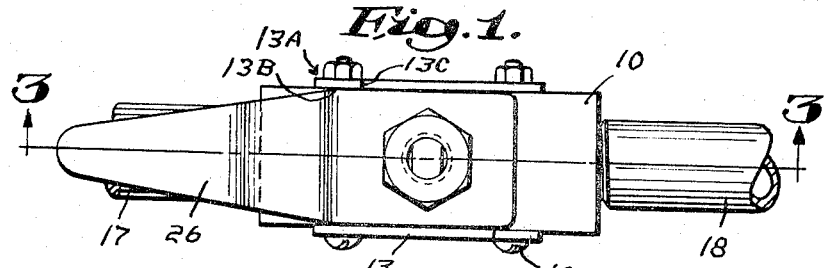

March 12, 1968  W. A. BRICE  3,372,706

SIDE ENTRY VALVES

Filed Oct. 23, 1965  2 Sheets-Sheet 1

Inventor:
William A. Brice,
by Abbott Spear.
Attorney

March 12, 1968  W. A. BRICE  3,372,706
SIDE ENTRY VALVES
Filed Oct. 23, 1965  2 Sheets-Sheet 2
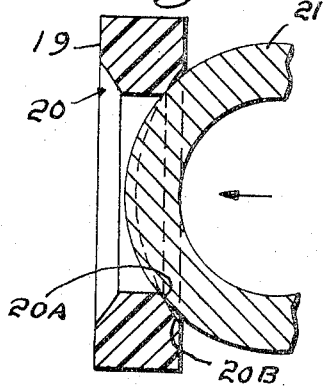
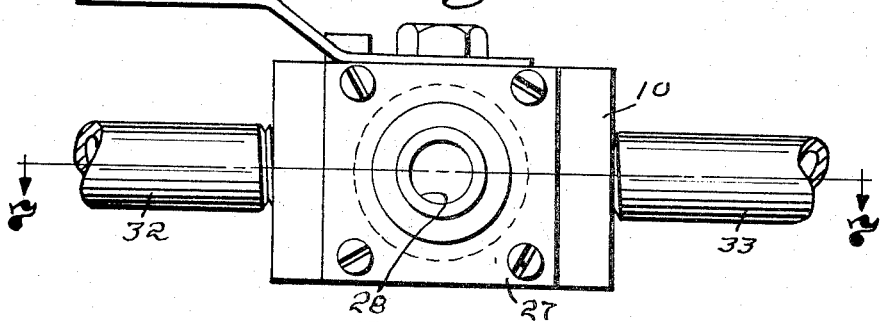
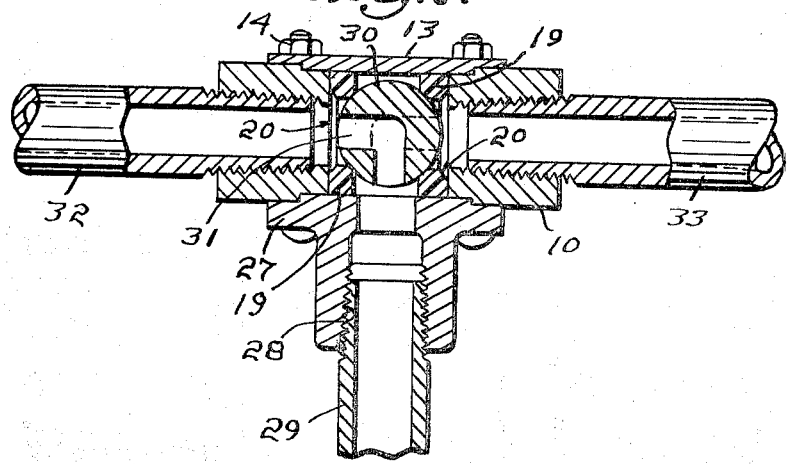
Inventor:
William A. Brice,
by [signature]
Attorney

United States Patent Office 3,372,706
Patented Mar. 12, 1968

3,372,706
SIDE ENTRY VALVES
William A. Brice, South Portland, Maine, assignor, by mesne assignments, to Ametek, Inc., New York, N.Y., a corporation of Delaware
Filed Oct. 23, 1965, Ser. No. 503,841
14 Claims. (Cl. 137—329.03)

The present invention relates to side entry valves and to valve seat members therefor.

Valves are, of course, widely used and while in some fields, special demands are encountered, usually a valve may be used in several fields provided that it affords positive, troublefree control of the liquid or liquids and provided that it can be quickly and easily installed and serviced.

The principal objectives of the present invention are concerned with valves meeting the above, generally indicated requirements. In accordance with the invention, these objectives are attained by providing a valve having a chamber in its body opening through at least one of its sides and closed by a detachable cover. Two valve seat members that may be identical have resiliently yieldable concave seats for a spherical valve member provided with a passage extending therethrough and adapted to be turned to effect desired valve operation by means of a stem rotatably supported by the body. The valve and seat members are insertable into the chamber as an assembly but require the yielding of the seats to enable such insertion to be effective, an annular portion of each seat close to its opening conforming to the engaged portions of the valve member when the assembly is within the chamber. A connection between the valve member and its stem is operable when the assembly is in place within the chamber.

It is preferred that each valve seat member have an annular space in back of its valve seat and this may advantageously be an identical seat. It is also preferred that the valve body chamber be rectangular in cross section with the valve seat members dimensioned to be a slidable fit therein.

It is also preferred that the valve body be of a rectangular cross sectional shape thus to provide both production and structural advantages that will be apparent from the following detailed description.

In the accompanying drawings, there are shown illustrative embodiments of the invention from which these and other of its objectives, novel features, and advantages will be apparent.

Figure 2:
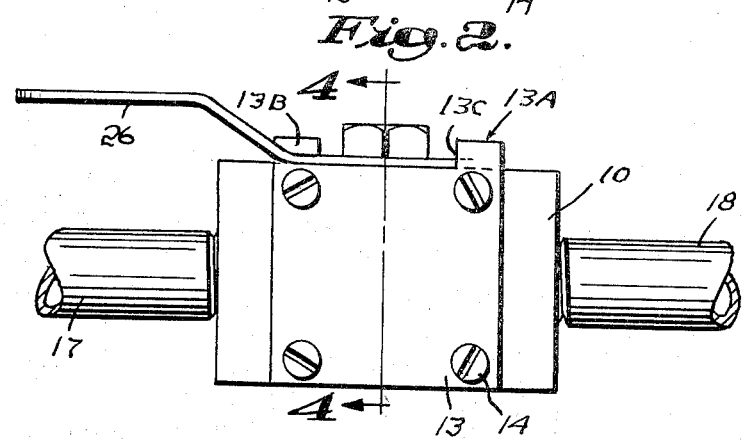
Figure 3:
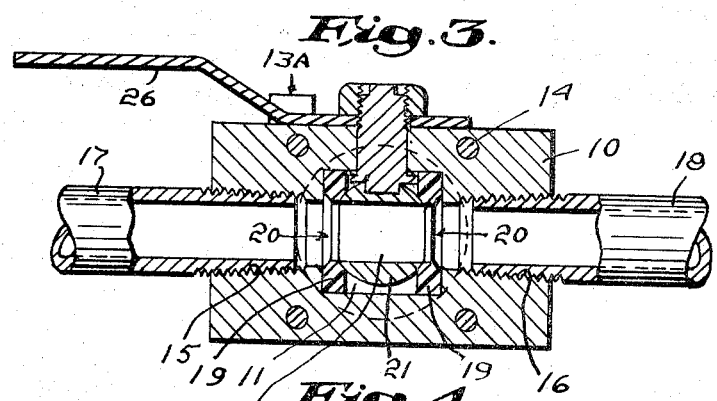
Figure 4:
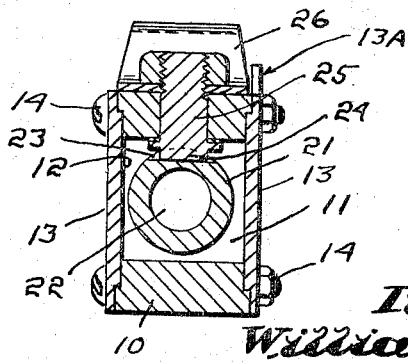

In the drawings:

FIGURE 1 is a top plan view of a valve in accordance with one embodiment of the invention, FIGURE 2 is a side view thereof, FIGURE 3 is a section taken approximately along the indicated lines 3—3 of FIGURE 1, FIGURE 4 is a section taken approximately along the indicated lines 4—4 of FIGURE 2, FIGURE 5 is a fragmentary section, on a substantially increased scale, through one of the valve seats and the valve member, FIGURE 6 is a side view of another embodiment of the invention, and FIGURE 7 is a section taken approximately along the indicated lines 7—7 of FIGURE 6.

In the embodiment of the invention illustrated by FIGURES 1–5, the valve has a flat-sided body 10 of a rectangular cross sectional shape. The body 10 has a chamber 11 shown as square, both lengthwise and transversely considered and as opening through both of its sides. Each side of the body 10 is recessed to accommodate a boss 12 formed on the inner face of a side cover 13 detachably bolted thereto as at 14 against a seal, if such is needed. Alined ports 15 and 16 in the ends of the body 10 are in communication with the chamber 11 and these are oppositely threaded to receive correspondingly threaded ends of the pipes 17 and 18, respectively, permitting the valve to be installed or removed by rotating its body 10 in one direction or the other, the body shape facilitating tool engagement therewith.

Within the chamber 11 there are identical square seat members 19 having concave seats 20, see FIGURE 5, on both faces. The inner portions 20A of the proximate faces are engaged by and yield axially to conform to the portions of the spherical valve member 21 that are in engagement therewith. The seats 20 are resiliently yieldable and in practice the seat members are formed from a resiliently yieldable material, polytetrafluoroethylene being satisfactory because of its low coefficient of friction, resistance to wear, and chemical inertness. The provision of valve seats 20 on each face of each valve seat member 19 is not only for the purpose of enabling one seat to be used when the other is no longer effective but also to provide an annular web, defined by the seat portion 20A, that will be resiliently, axially yieldable to conform to the shape of the valve member 21.

In practice each concave seat 20 includes an outer portion 20B, see FIGURE 5, which is not engaged by the valve member 21 and the inner portion 20A, which, while of the same radius as the valve member 21, does not become concentric therewith until the web has axially yielded to a slight extent.

The length of the chamber 11 is such that, with the valve member 21 between two seat members 19, the overall length of that assembly is somewhat greater, requiring that it be compressed when within the chamber 11. In practice, the assembly is inserted into the chamber 11 with its seat member 19 converging to an extent permitting the assembly to be started therein. The seat member 19 may then be pressed into place with the wedging action resulting in the above referred-to yielding of the seat portions 20A to an extent ensuring that they conform to the valve member 21 and are frictionally held in place.

The valve member 21 has a passage 22 extending diametrically therethrough for effecting communication between the ports 15 and 16 and a keyway 23 in its periphery to slidably fit in the key 24 on the end of a stem 25 rotatably supported by the body 10 and having a handle 26 locked on its upper end. This key and keyway are in alinement when the assembly is placed in or removed from the chamber 11.

The side covers 13 are identical and each includes a stop 13A adjacent one side thereof. It will be noted from FIGURE 1 that the handle 26, in the zone where it is attached to the stem 25, is of approximately the same width as the body 10 and the stops 13A provide portions 13B spaced apart to engage opposite sides of the handle 26 when it is in alinement with the pipes, its open position, and portions 13C spaced apart to similarly engage the handle 26 when it is swung through an arc of 90° to establish the closed position of the valve.

The embodiment of the invention illustrated by FIGURES 6 and 7 is generally similar and the same reference numerals are employed for the corresponding parts. In the embodiment, however, one side cover 13 is replaced by a side member 27 secured by the bolts 14 and having a port 28 internally threaded to receive the outlet 29. The valve member 21 has been replaced by a spherical valve member 30 having its passage 31 in the form of two radial portions intersecting at an angle of 90°. When the handle is moved from one position to another, first one and then the other of the supply pipes 32, 33 is connected to the outlet 29.

From the foregoing it will be apparent that valves in accordance with the invention may be manufactured economically and are well adapted to be easily installed and serviced as well to meet operating requirements. By way of illustration, during installation, if joints are to be soldered or welded, the valve seat members and valve member may be easily and quickly removed to prevent injury by heat. Should a valve need service the assembly can be quickly removed and replaced with its seat members 19 reversed to bring their other seats into use.

I claim:

1. In a side entry valve, a body having a chamber opening through one of its sides and aligned ports in opposite ends in communication with said chamber, a side cover for said chamber detachably attached to said body, a pair of members each including concave seats that are resiliently yieldable, a spherical valve member between said seat members and having a passage extending therethrough, valve operating means including a valve stem rotatably supported by said body, said seats and said valve member being insertable as an assembly into said chamber through said side opening but requiring the yielding of said seats to enable such insertion to be effected, an annular portion of each seat close to its opening conforming to the engaged portions of said valve member when the assembly is inserted, and a connection between said valve member and said stem operable when said assembly is in place within said chamber.

2. The valve of claim 1 in which the chamber also opens through the other side of the body and there is a detachable cover for the other side opening.

3. The valve of claim 1 in which the chamber also opens through the other side of the body, there is a detachable cover for the other side opening, and both openings are dimensioned to enable the assembly to be inserted into or removed from the chamber therethrough.

4. The valve of claim 1 in which the connection between the valve member and the stem comprises a key within the chamber on the end of the stem and the valve member has a keyway in its periphery.

5. The valve of claim 1 in which the valve member passage extends straight through the center of the valve member.

6. The valve of claim 1 in which there is a third port opening into the chamber through the other side of the body midway between the other ports and the valve member passage has radial portions disposed at right angles to each other.

7. The valve of claim 1 in which the member has identical seats on their other surfaces.

8. The valve of claim 1 in which the members are of a plastic having the yieldable resilience and friction-minimizing properties of polytetrafluoroethylene.

9. The valve of claim 1 in which the members are of a plastic having the yieldable resilience and friction-minimizing properties of polytetrafluoroethylene and both faces of the members have identical concave seats.

10. The valve of claim 1 in which there is an annular space in back of the annular portion of each valve seat.

11. The vave of claim 1 in which the chamber is rectangular in section and each seat member is of the same dimensions as the end walls of the chamber to slidably guide when entered into the chamber.

12. The valve of claim 1 in which the chamber is square in section and each seat member is of the same dimensions as the end walls of the chamber to slidably guide when entered into the chamber.

13. The valve of claim 1 in which the body is of rectangular cross section.

14. The valve of claim 1 in which the body is of rectangular cross section, the side covers are identical, each side cover includes a stop adjacent one side that protrudes above the body, each stop providing two stop portions disposed 90° from each other, the spacing between the two corresponding stop portions and the width of the handle being equal, and the handle axis being centrally with respect thereto.

References Cited

UNITED STATES PATENTS

| | | | |
|---|---|---|---|
| 2,089,848 | 8/1937 | Hoferle | 137—454.2 X |
| 3,056,577 | 10/1962 | Kulisek | 251—317 X |

WILLIAM F. O'DEA, *Primary Examiner.*

D. R. MATTHEWS, *Assistant Examiner.*